United States Patent
Kang et al.

(10) Patent No.: US 9,650,515 B2
(45) Date of Patent: May 16, 2017

(54) POLYARYLENE SULFIDE RESIN COMPOSITION AND A PREPARATION METHOD THEREOF

(71) Applicant: SK CHEMICALS CO., LTD., Gyeonggi-do (KR)

(72) Inventors: Byoung Gook Kang, Gyeonggi-do (KR); Il-Hoon Cha, Seoul (KR); Sung-Gi Kim, Gyeonggi-do (KR); Se-Ho Lee, Gyeonggi-do (KR)

(73) Assignee: SK CHEMICALS CO., LTD. (KR)

( * ) Notice: Subject to any disclaimer, the term of this patent is extended or adjusted under 35 U.S.C. 154(b) by 0 days.

(21) Appl. No.: 14/406,579

(22) PCT Filed: Jun. 5, 2013

(86) PCT No.: PCT/KR2013/004976
§ 371 (c)(1),
(2) Date: Dec. 9, 2014

(87) PCT Pub. No.: WO2013/187631
PCT Pub. Date: Dec. 19, 2013

(65) Prior Publication Data
US 2015/0141550 A1    May 21, 2015

(30) Foreign Application Priority Data

Jun. 11, 2012  (KR) .................. 10-2012-0062213

(51) Int. Cl.
| | | |
|---|---|---|
| *C08L 81/04* | (2006.01) | |
| *C08L 23/08* | (2006.01) | |
| *C08L 23/14* | (2006.01) | |
| *C08L 33/08* | (2006.01) | |
| *C08L 33/10* | (2006.01) | |
| *C08L 63/00* | (2006.01) | |
| *C08L 81/02* | (2006.01) | |

(52) U.S. Cl.
CPC ............... *C08L 81/04* (2013.01); *C08L 81/02* (2013.01); *C08L 23/0884* (2013.01)

(58) Field of Classification Search
None
See application file for complete search history.

(56) References Cited

U.S. PATENT DOCUMENTS

| 2,513,188 A | 6/1950 | Macallum |
|---|---|---|
| 2,583,941 A | 1/1952 | Gordon |
| 4,276,397 A * | 6/1981 | Froix .................. C08L 67/00 524/539 |
| 4,746,758 A | 5/1988 | Rule et al. |
| 4,786,713 A | 11/1988 | Rule et al. |
| 4,889,893 A * | 12/1989 | Kobayashi ......... C08G 75/0277 524/500 |
| 2003/0166797 A1 | 9/2003 | Lambla et al. |
| 2010/0240863 A1* | 9/2010 | Hinokimori ....... C08G 75/0259 528/388 |
| 2013/0059976 A1* | 3/2013 | Matsuo ............... B29C 49/0005 525/189 |

FOREIGN PATENT DOCUMENTS

| CN | 1165584 | 9/2004 | |
|---|---|---|---|
| CN | 102224202 | 10/2011 | |
| EP | 0486014 | 5/1990 | |
| EP | 1243618 | 9/2002 | |
| JP | H08-151518 | 6/1996 | |
| JP | 2008-214383 | 9/2008 | |
| JP | 2011-020401 | 2/2011 | |
| JP | 2011173946 A1 * | 9/2011 | ............. C08L 81/02 |
| KR | 10-1992-0004510 A | 3/1992 | |
| KR | 10-2010-0079952 A | 7/2010 | |
| WO | WO 9118055 A1 * | 5/1991 | ............. C08L 81/02 |
| WO | WO 2007/102826 | 9/2007 | |
| WO | WO 2009/105527 | 8/2009 | |
| WO | WO 2011-070968 A1 | 6/2011 | |
| WO | WO 2011-148929 A1 | 12/2011 | |
| WO | WO 2014/025190 | 2/2014 | |

OTHER PUBLICATIONS

Abstract of JP 2011173946 A1 (no date).*
International Search Report prepared by the Korean Patent Office on Aug. 23, 2013, for International Application No. PCT/KR2013/004976.
Extended Search Report for European Patent application No. 13803433.5, dated Dec. 11, 2015, 6 pages.

* cited by examiner

*Primary Examiner* — Michael J Feely
(74) *Attorney, Agent, or Firm* — Sheridan Ross P.C.

(57) ABSTRACT

The present invention relates to a polyarylene sulfide resin composition having excellent impact resistance in which a polyarylene sulfide resin having a specific end group, an epoxy-containing olefin-based elastomer, and/or an organic or inorganic filler are included, and a preparation method thereof.

21 Claims, 1 Drawing Sheet

POLYARYLENE SULFIDE RESIN COMPOSITION AND A PREPARATION METHOD THEREOF

CROSS REFERENCE TO RELATED APPLICATIONS

This application is a national stage application under 35 U.S.C. 371 and claims the benefit of PCT Application No. PCT/KR2013/004976 having an international filing date of Jun. 5, 2013, which designated the United States, which PCT application claimed the benefit of Korean Patent Application No. 10-2012-0062213 filed on Jun. 11, 2012, the disclosure of each of which are incorporated herein by reference.

BACKGROUND OF THE INVENTION (a) Field of the Invention

The present invention relates to a polyarylene sulfide resin composition, and a preparation method thereof. More specifically, the present invention relates to a polyarylene sulfide resin composition having excellent impact resistance, and a preparation method thereof.

(b) Description of the Related Art

Polyarylene sulfide is a representative engineering plastic, and the demand for the same to be used for the products used in a high temperature and corrosive environment or the electronic goods is increasing due to its high chemical resistance, flame resistance, electric insulation, mechanical properties, and so on.

Among the polyarylene sulfides, polyphenylene sulfide (PPS) is commercially on sale now. The commercial preparation process of PPS being applicable until now is the method of carrying out a solution polymerization of p-dichlorobenzene (pDCB) and sodium sulfide in a polar organic solvent such as N-methylpyrrolidone, and it is known as Macallum process.

The typical process is disclosed in U.S. Pat. Nos. 2,513, 188 and 2,583,941. Several kinds of usable polar solvents are suggested but N-methylpyrrolidone is mostly used. The process uses only dichloro aromatic compounds as the raw materials, and sodium chloride (NaCl) salt is formed as a by-product.

However, such solution polymerization type of Macallum process requires a washing and drying process for eliminating the salt formed as a by-product and the organic solvent used. Furthermore, since the prepared product is a powder form and the apparent density is relatively low, it is disadvantageous in transportation, and the post processability and the workability may be deteriorated in the process of preparing articles because the raw materials are not smoothly inserted.

Meanwhile, U.S. Pat. Nos. 4,746,758 and 4,786,713 suggested the method of preparing the polyarylene sulfide (PAS) such as PPS and the like by melt-polymerizing the reactant including diiodioaromatic compounds and sulfur element. These patents disclose that the PAS can be obtained by using diiodo compounds and solid sulfur instead of dichloro compounds and metal sulfide of existing process and directly heating the reactant without a polar solvent. The method is composed of 2 steps of iodation process and polymerization process. The iodation process prepares the diiodo compounds by reacting aryl compounds with iodine, and the polymerization process prepares the PAS of high molecular weight by reacting the diiodo compounds with solid sulfur. Iodine steam is generated during the reaction and the steam may be collected and reacted with the aryl compounds again.

Such new methods can resolve the problems of existing Macallum process. Most of all, since the by-product is iodine, there is no problem of increasing electric conductivity like metal salt and its content included in the final product can be lowered easier than the content of metal salts of existing processes because it can be easily collected from the reaction product. Furthermore, the collected iodine can be reused in the iodation process and thus it can reduce the waste largely. In addition, these polymerization processes do not use solvents and can produce pellet type products like existing polyester products, and thus it can resolve the problems caused by using the fine powder products.

However, in the case of the polyarylene sulfide prepared by the melt-polymerization method, since the end of the main chain is composed of iodine and most aryl groups (representatively, benzene), there is substantially no functional group at the end of the main chain and consequently its compatibility with other polymer materials and/or all sorts of reinforcements or fillers like glass fiber and the like may be low.

SUMMARY OF THE INVENTION

The present inventors continued researches for providing a polyarylene sulfide resin having improved impact resistance and compatibility with polymer materials and/or all sorts of reinforcements or fillers while maintaining the characteristics of polyarylene sulfide, and a resin composition including the same. As the result, the present inventors discovered that when the polyarylene sulfide is prepared by melt-polymerizing the reactant including diiodoaromatic compounds and sulfur element, the crystallinity of the polyarylene sulfide resin increases and the impact resistance and the strength are improved by the carboxyl groups (COOH) introduced to at least part of the end group of the main chain, and the compatibility with other polymer materials (for example, olefin-based elastomers) and/or reinforcements or fillers becomes excellent due to the carboxyl groups.

It is an aspect of the present invention to provide a polyarylene sulfide resin composition which has superior impact resistance and is especially suitable for an injection molding, and a preparation method thereof.

It is another aspect of the present invention to provide a shaped article including the polyarylene sulfide resin composition.

Method of Solving the Problems

The present invention provides a polyarylene sulfide resin composition, including 60 to 95 wt % of a polyarylene sulfide resin (A) of which at least part of the end group of the polyarylene sulfide main chain is substituted by a carboxyl group (COOH), and 5 to 40 wt % of an epoxy-containing olefin-based elastomer (B).

One embodiment of the present invention provides a polyarylene sulfide resin composition, including 70 to 85 wt % of a polyarylene sulfide resin (A) of which at least part of the end group of the polyarylene sulfide main chain is substituted by a carboxyl group, and 15 to 30 wt % of an epoxy-containing olefin-based elastomer (B).

The present invention also provides a polyarylene sulfide resin composition, including 100 parts by weight of a resin mixture consisting of 60 to 95 wt % of a polyarylene sulfide resin (A) of which at least part of the end group of the polyarylene sulfide main chain is substituted by a carboxyl group, and 5 to 40 wt % of an epoxy-containing olefin-based elastomer (B), or a resin mixture consisting of 70 to 85 wt % of a polyarylene sulfide resin (A) and 15 to 30 wt % of an epoxy-containing olefin-based elastomer (B); and 1 to 50 parts by weight of an organic or inorganic filler (C).

In one embodiment of the present invention, the content of the polyarylene sulfide resin (A) may be 70 to 85 wt %, and the content of the epoxy-containing olefin-based elastomer (B) may be 15 to 30 wt %.

In one embodiment of the present invention, the polyarylene sulfide resin (A) substituted with carboxyl group may include the structure unit represented by the following General Formula 1 in the amount of 70 mol % or more:

(SAr)$n$-COOH  [General Formula 1]

wherein, Ar is an arylene group.

Here, the arylene group may be at least one selected from the group consisting of p-phenylene group, m-phenylene group, o-phenylene group, and a substituted phenylene group.

In one embodiment of the present invention, the epoxy-containing olefin-based elastomer (B) may include an epoxy-containing monomer selected from the group consisting of glycidyl acrylate and glycidyl methacrylate. The content of the epoxy-containing monomer may be 0.001 to 40 mol % per the whole epoxy-containing olefin-based elastomer.

In one embodiment of the present invention, the composition may further include an antioxidant. The content of the antioxidant may be 0.01 to 5 wt %.

In one embodiment of the present invention, the organic or inorganic filler may be one or more selected from the group consisting of glass fiber, carbon fiber, boron fiber, glass bead, glass flake, talc, and calcium carbonate.

In one embodiment of the present invention, the impact strength of the polyarylene sulfide resin composition measured according to ASTM D 256 may be 3.0 to 20.0 KJ/m$^2$, and specifically may be 5.0 to 15.0 KJ/m$^2$.

The present invention also provides a method of preparing a polyarylene sulfide resin composition, including the steps of: polymerizing a reactant including a diiodioaromatic compound and sulfur element; adding a compound having a carboxyl group while carrying out the polymerization step so as to prepare a polyarylene sulfide resin (A) of which at least part of the end group of the polyarylene sulfide main chain is substituted by a carboxyl group; and compounding the polyarylene sulfide resin (A) and an epoxy-containing olefin-based elastomer (B), or compounding the polyarylene sulfide resin (A), the epoxy-containing olefin-based elastomer (B), and an organic or inorganic filler (C).

In one embodiment of the present invention, the compound having a carboxyl group may be one or more compounds selected from the group consisting of 2-iodobenzoic acid, 3-iodobenzoic acid, 4-iodobenzoic acid, and 2,2'-dithiobenzoic acid. The compound having a carboxyl group is added in the amount of about 0.0001 to 5 parts by weight per 100 parts by weight of the diiodoaromatic compound.

In one embodiment of the present invention, the diiodoaromatic compound may be one or more compounds selected from the group consisting of diiodobenzene, diiodonaphthalene, diiodobiphenyl, diiodo bisphenol, diiodobenzophenone, p-diiodobenzene (pDIB), 2,6-diiodonaphthalene, and p,p'-diiodobiphenyl.

In one embodiment of the present invention, the compounding step may be carried out in a twin-screw extruder.

In one embodiment of the present invention, the polyarylene sulfide resin (A) substituted with carboxyl group may include the structure unit represented by the following General Formula 1 in the amount of 70 mol % or more, or 85 mol % or more:

—(SAr)$n$-COOH  [General Formula 1]

wherein, Ar is an arylene group.

In one embodiment of the present invention, the epoxy-containing olefin-based elastomer (B) may include an epoxy-containing monomer selected from the group consisting of glycidyl acrylate and glycidyl methacrylate. The content of the epoxy-containing monomer may be 0.001 to 40 mol % per the whole epoxy-containing olefin-based elastomer.

In one embodiment of the present invention, the organic or inorganic filler is one or more selected from the group consisting of glass fiber, carbon fiber, boron fiber, glass bead, glass flake, talc, and calcium carbonate.

In another aspect of the present invention, one embodiment of the present invention may provide a shaped article, including the polyarylene sulfide resin composition according to the present invention. The shaped article may be the form of film, sheet, or fiber.

Effects of the Invention

The polyarylene sulfide resin composition according to the present invention shows excellent compatibility with olefin-based elastomer which is a polymer material and/or reinforcements while maintaining the characteristics of polyarylene sulfide.

Furthermore, the polyarylene sulfide resin composition is superior in impact resistance enough for an injection molding particularly.

DETAILED DESCRIPTION OF THE EMBODIMENTS

Resin Composition

Figure 1:
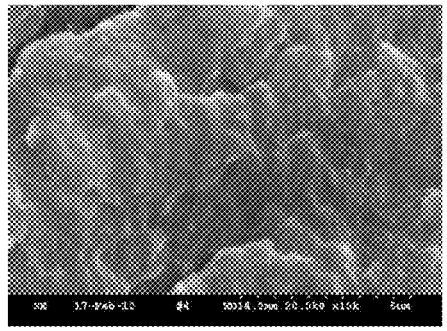
FIG. 1 is a scanning electron microscopy (SEM) photo of the specimen made of the resin composition of Example 1 before etching.

In one embodiment of the present invention, the polyarylene sulfide resin composition may include 60 to 95 wt % of a polyarylene sulfide resin (A) of which at least part of the end group of the polyarylene sulfide main chain is substituted by a carboxyl group (COOH), and 5 to 40 wt % of an epoxy-containing olefin-based elastomer (B).

In another embodiment of the present invention, the polyarylene sulfide resin composition may include 70 to 85 wt % of a polyarylene sulfide resin (A) of which at least part of the end group of the polyarylene sulfide main chain is substituted by a carboxyl group, and 15 to 30 wt % of an epoxy-containing olefin-based elastomer (B).

In another embodiment of the present invention, the polyarylene sulfide resin composition may include 100 parts by weight of a resin mixture consisting of 60 to 95 wt % of a polyarylene sulfide resin (A) of which at least part of the end group of the polyarylene sulfide main chain is substituted by a carboxyl group, and 5 to 40 wt % of an epoxy-containing olefin-based elastomer (B), or a resin mixture consisting of 70 to 85 wt % of a polyarylene sulfide resin (A) and 15 to 30 wt % of an epoxy-containing olefin-based elastomer (B); and 1 to 50 parts by weight of an organic or inorganic filler (C).

When the content of the olefin-based elastomer is excessively low in the polyarylene sulfide resin composition, it is difficult to obtain the improvement effect of impact resistance, and when the content is excessively high, not only thermal stability of the polyarylene sulfide resin may be decreased but also processing safety may be deteriorated due to the increased viscosity during the melt-mixing process.

The resin composition according to the present invention may further include an antioxidant. Here, primary and secondary antioxidants may be used as an oxidation stabilizer.

The resin composition according to the present invention may further include a lubricant for improving moldability. At this time, it is possible to provide releasability such as the prevention of friction between the resin and the metal of the mold, and the release from the mold by using hydrocarbon-based lubricants.

Furthermore, various common additives well known in the art may be included in addition.

Hereinafter, the constituents of the resin composition according to the present invention are explained in more detail.

(A) Polyarylene Sulfide Resin

The polyarylene sulfide resin composition may be a polyarylene sulfide resin of which at least part of the end group of the polyarylene sulfide main chain is substituted by a carboxyl group, and may include the structure unit represented by the following General Formula 1 in the amount of 70 mol % or more, and specifically 85 mol % or more. For example, the polyarylene sulfide resin may be a polyphenylene sulfide resin:

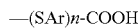
—(SAr)$n$-COOH         [General Formula 1]

wherein, Ar is an arylene group.

Here, for example, the arylene group may be p-phenylene group, m-phenylene group, o-phenylene group, a substituted phenylene group, and so on. Specifically, the substituted phenylene group may be a phenylene group arbitrarily substituted with one or more of F, Cl, Br, a $C_1$~$C_3$ alkyl, trifluoromethyl, a $C_1$~$C_3$ alkoxy, trifluoromethoxy, trifluoromethylthio, dimethylamino, cyano, a ($C_1$~$C_3$ alkyl)$SO_2$—, a ($C_1$~$C_3$ alkyl)$NHSO_2$—, a ($C_1$~$C_3$ alkyl)$_2NSO_2$—, and $NH_2SO_2$—.

In one embodiment, the polyarylene sulfide of the present invention may show a peak derived from carboxyl groups of the end of the main chain at 1600 to 1800 $cm^{-1}$ in a FT-IR spectrum when it is analyzed by FT-IR spectroscopy. At this time, the intensity of the peak at 1600 to 1800 $cm^{-1}$ may correspond to the content of carboxyl groups bonded to the end group of the main chain.

In another embodiment, the relative height intensity of the peak at 1600 to 1800 $cm^{-1}$ may be 0.001 to 10% in the FT-IR spectrum of the polyarylene sulfide when the height intensity of the ring stretch peak shown at 1500 to 1600 $cm^{-1}$ is assumed as 100% (comparing the heights relatively). At this time, the ring stretch peak shown at 1500 to 1600 $cm^{-1}$ may be the peak derived from phenylene groups included in the main chain of the polyarylene sulfide. Since the height intensity of the peak at 1600 to 1800 $cm^{-1}$ derived from carboxyl groups is 0.001 to 10%, or 0.01 to 7%, or 0.1 to 4%, relative to the height intensity of the peak derived from phenyl groups, the polyarylene sulfide resin composition of one embodiment of the present invention can maintain the superior properties unique to polyarylene sulfide while showing more excellent compatibility with olefin-based elastomers and/or fillers.

For example, melting point of the polyarylene sulfide according to one embodiment of the present invention may be about 265 to 290° C., or about 275 to 283° C., its number average molecular weight may be about 5,000 to 50,000, the polydispersity index defined as weight average molecular weight divided by number average molecular weight may be about 2.0 to 4.5, and its melt viscosity measured at 300° C. with a rotational disk viscometer may be in the range of about 10 to 50,000 poise.

(B) Epoxy-Containing Olefin-Based Elastomer

For example, the part including the functional group of the epoxy-containing olefin-based elastomer may be a monomer containing glycidyl acrylate, glycidyl methacrylate, and the like. The content of the epoxy-containing monomer may be 0.001 to 40 mol %, specifically 0.01 to 35 mol %, per the whole epoxy-containing olefin-based elastomer. However it is not limited by or to this.

(C) Filler

The filler is an organic or inorganic filler, and it may be one or more selected from the group consisting of glass fiber, carbon fiber, boron fiber, glass bead, glass flake, talc, and calcium carbonate, and it may be the form of powder or flake but it is not limited particularly. The filler may be included in the amount of 1 to 50 parts by weight, or 1 to 30 parts by weight, per 100 parts by weight of the mixture of resins (A) and (B) in order to maintain the compatibility with olefin-based elastomers while maintaining superior properties of polyarylene sulfide resin.

(D) Other Additives

The resin composition of the present invention may further include an antioxidant such as phenol-based, amine-based, sulfur-based, and phosphorus-phased compounds for maintaining high heat resistance and thermal stability. The antioxidant may be included in the amount of 0.01 to 5 wt %. The amount may be 0.01 wt % or more, specifically 0.02 wt % or more, in the aspect of improving heat resistance, and it may be 5.0 wt % or less, specifically 1 wt % or less in the aspect of gas occurring during a figuration process.

As the phenol-based antioxidant, hindered phenol-based compounds may be used preferably. For example, tetrakis [methylene-3-(3,5-di-tert-butyl-4-hydroxyphenyl)propionate]methane, thiodiethylene bis[3-(3,5-di-tert-butyl-4-hydroxyphenyl)propionate] N,N'-hexane-1,6-diylbis[3-(3,5-di-tert-butyl-4-hydroxyphenylpropionamide], and the like may be used.

As the phosphorus-based antioxidant, tris(2,4-di-tert-butylphenyl)phosphate, o,o'-dioctadecylpentaerythritol bis (phosphite), bis(2.4-di-tert-butylphenyl)pentaerythritol diphosphite, 3,9-bis(2,4-di-tert-butylphenoxy)-2,4,8,10-tetra oxa-3,9-diphosphaspiro[5.5]undecane, and the like may be used.

Furthermore, the resin composition of the present invention may further include various lubricants for improving moldability. At this time, it is possible to provide releasability such as the prevention of friction between the resin and the metal of the mold, and the release from the mold by using hydrocarbon-based lubricants.

In addition, the composition may further include various common additives well known in the art such as a photo-stabilizer, an UV stabilizer, a plasticizer, a nucleating agent, and so on.

Preparation of Polyarylene Sulfide Resin (A)

According to one embodiment of the present invention, a method of preparing the polyarylene sulfide of which at least part of the end group of the polyarylene sulfide main chain is substituted by a carboxyl group is provided. The preparation method may include the steps of polymerizing a reactant including a diiodoaromatic compound and sulfur element; and adding a compound having a carboxyl group while carrying out the polymerization step.

In one embodiment, the compound having a carboxyl group may be added when the polymerization reaction of the diiodoaromatic compound and sulfur element is progressed about 70% or more, or about 90% or more (for example, at the latter part of the polymerization reaction). At this time, the progressing rate of the polymerization reaction of the diiodoaromatic compound and sulfur element can be identified by a person skilled in the art according to a viscometry method well known in the art.

In one embodiment, any compound which can introduce a carboxyl group to the end of the polyarylene sulfide may be used as the compound having a carboxyl group without particular limitation, and any monomer-type compound having a carboxyl group may be used. For example, 2-iodobenzoic acid, 3-iodobenzoic acid, 4-iodobenzoic acid, 2,2'-dithiobenzoic acid, and the like may be used but it is not limited to or by them.

The amount of the compound having a carboxyl group, for example, may be about 0.0001 to 5 parts by weight per 100 parts by weight of the diiodoaromatic compound.

The polyarylene sulfide of one embodiment may show a peak derived from carboxyl groups of the end of the main chain at 1600 to 1800 cm$^{-1}$ in a FT-IR spectrum when it is analyzed by FT-IR spectroscopy. At this time, the intensity of the peak at 1600 to 1800 cm$^{-1}$ may correspond to the content of carboxyl groups bonded to the end group of the main chain.

According to one example, the relative height intensity of the peak at 1600 to 1800 cm$^{-1}$ may be 0.001 to 10% in the FT-IR spectrum of the polyarylene sulfide when the height intensity of the ring stretch peak shown at 1500 to 1600 cm$^{-1}$ is assumed as 100% (comparing the heights relatively). At this time, the ring stretch peak shown at 1500 to 1600 cm$^{-1}$ may be the peak derived from phenylene groups included in the main chain of the polyarylene sulfide. Since the peak at 1600 to 1800 cm$^{-1}$ derived from carboxyl groups shows the height intensity of 0.001 to 10%, or 0.01 to 7%, or 0.1 to 4%, relative to the height intensity of the peak derived from phenyl groups, the polyarylene sulfide of one embodiment can maintain the superior properties unique to polyarylene sulfide while showing more excellent compatibility with other polymer materials.

In one embodiment, the diiodoaromatic compound which can be used in the polymerization reaction may be one or more compounds selected from the group consisting of diiodobenzene (DIB), diiodonaphthalene, diiodobiphenyl, diiodo bisphenol, and diiodobenzophenone, but not limited to. The diiodoaromatic compound to which an alkyl group or a sulfone group is bonded as a substituent, or the diiodoaromatic compound including oxygen or nitrogen atom in the aromatic group also may be used. The diiodoaromatic compound includes various isomers of the diiodo compound according to the position to which iodine atom is attached. Among the isomers, the compounds having iodine at para-position like p-diiodobenzene (pDIB), 2,6-diiodonaphthalene, or p,p'-diiodobiphenyl may be used more suitably.

In one embodiment, the form of sulfur element which reacts with the diiodoaromatic compound is not limited particularly. Generally, sulfur element exists in a cyclooctasulur (S8) form in which 8 atoms are connected at room temperature. However, even if not such form, any solid type or liquid type sulfur which can be used commercially may be used without particular limitation.

According to the present invention, the reactant may further include a polymerization initiator, a stabilizer, or a mixture thereof. As the polymerization initiator, mercaptobenzothiazole, 2,2'-dithiobenzothiazole, cyclohexylbenzothiazole sulfenamide, butylbenzothiazole sulfenamide, or a mixture thereof, for example, but it is not limited to or by them.

As the stabilizer, common stabilizers for resin polymerization reaction may be used.

In order to terminate the polymerization reaction of the present invention, a polymerization inhibitor may be added thereto at the appropriate time. At this time, any polymerization inhibitor which can terminate the polymerization by eliminating iodine group included in the polymerized polymer can be used without particular limitation. Specifically, one or more compound selected from the group consisting of diphenyl sulfide, diphenyl ether, diphenyl, benzophenone, dibenzothiazole disulfide, monoiodoaryl compound, benzothiazoles, benzothiazolesulfenamides, thiurams, dithiocarbamates, and diphenyl disulfide.

Meanwhile, the time of adding the polymerization inhibitor may be determined by considering the molecular weight of the polyarylene sulfide to be polymerized finally. For example, the inhibitor may be added at the time of that about 70 to 100 wt % of the diiodoaromatic compound included in the initial reactant are reacted and exhausted.

And, the polymerization reaction may be carried out with any condition which can initiate the polymerization of the reactant including the diiodoaromatic compound and sulfur element. For example, the polymerization reaction may be carried out with a temperature-rising and pressure-reducing reaction condition. At this time, the condition may be carried out for about 1 to 30 hrs while varying the temperature and pressure condition from the initial reaction condition of about 180 to 250° C. and about 50 to 450 torr to the final reaction condition of about 270 to 350° C. and about 0.001 to 20 torr. For more concrete example, the final reaction condition of the polymerization reaction may be about 280 to 300° C. and 0.1 to 0.5 torr.

Meanwhile, the preparation method of the polyarylene sulfide according to another embodiment may further include the step of melt-compounding the reactant including the diiodoaromatic compound and sulfur element before the polymerization reaction. The condition of the melt-compounding is not limited as long as all of the reactant are melted and compounded, and for example, the process may be carried out at the temperature of about 130° C. to 200° C., or about 160° C. to 190° C.

Like this, by carrying out the melt-compounding step before the polymerization reaction, it is possible to carry out succeeding polymerization reaction more easily.

Furthermore, in the preparation method of polyarylene sulfide according to another embodiment, the polymerization reaction may be carried out in the presence of a nitrobenzene-based catalyst. And, when the melt-compounding step is carried out before the polymerization reaction as disclosed above, the catalyst may be added in the melt-compounding step. As the nitrobenzene-based catalyst, 1,3-diiodo-4-nitrobenzene or 1-iodo-4-nitrobenzene may be used but it is not limited to or by them.

Preparation Method of Polyarylene Sulfide Resin Composition

The polyarylene sulfide resin composition may be prepared by compounding the polyarylene sulfide (A) prepared by the method disclosed above and the epoxy-containing olefin-based elastomer (B), or by compounding the polyarylene sulfide resin (A), the epoxy-containing olefin-based elastomer (B), and the organic or inorganic filler (C).

For example, the composition may be prepared by mixing and extruding the prepared polyarylene sulfide resin (A) with a twin screw extruder, while adding the epoxy-containing olefin-based elastomer (B) and/or the organic or inorganic filler (C).

According to still another embodiment of the present invention, a shaped article made of the polyarylene sulfide resin composition of the present invention is provided. The resin composition of the present invention can be made into the shaped article which has excellent impact resistance and is applicable to various uses, according to the shaping methods known in the art.

The shaped article may be various shapes such as a film, a sheet, a fiber, and the like. And, the shaped article may be an injection molded article, an extruded article, or a blown article. In the injection molding process, the mold temperature may be about 50° C. or more, about 60° C. or more, or about 80° C. or more in the aspect of crystallization, and the temperature may be about 190° C. or less, about 170° C. or less, or about 160° C. or less in the aspect of deformation of specimen.

And, if the shaped article is a film or a sheet, it may be made into an undrawn, a uniaxially drawn, or a biaxially drawn film or sheet. If it is a fiber, it may be made into an undrawn, a drawn, or an ultradrawn fiber, and it may be used to a fabric, a knit, a nonwoven (spunbond, meltblown, or staple), a rope, or a net.

Such shaped article may be used to electric & electronic parts such as computer parts, architectural elements, car parts, machine parts, daily necessities, coating parts to which chemical materials contact, industrial chemical resistant fiber, and the like.

In the present invention, further details besides the disclosure above may be added and subtracted with necessity, and they are not limited particularly in the present invention.

Hereinafter, preferable examples are presented for understanding the present invention. However, the following examples are only for illustrating the present invention and the present invention is not limited to or by them.

EXAMPLES

Preparation Example

Synthesis of Polyphenylene Sulfide (PPS) Including a Carboxyl Group at the End of the Main Chain After melting and mixing the reactant including 5,130 g of p-diiodobenzene (pDIB), 450 g of sulfur, and 4 g of mercaptobenzothiazole as a reaction initiator, completely in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. to 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%]), 25 g of mercaptobenzothiazole was added thereto as a polymerization inhibitor and the reaction was carried out for 1 hr. Subsequently, after adding 51 g of 4-iodobenzoic acid thereto and progressing the reaction under nitrogen circumstance for 10 mins, the reaction was further progressed with slowly vacuumizing to 0.5 torr or less for 1 hr, and terminated. By this, the polyarylene sulfide resin having a carboxyl group at the end of the main chain was synthesized. The final resin obtained by the reaction was prepared into pellets by using a small strand cutter.

The polyarylene sulfide resin of Example 1 was analyzed by FT-IR spectroscopy. At this time, the carboxyl group peak was recognized at 1600 to 1800 $cm^{-1}$ in the spectrum. It was also recognized that the relative height intensity of the peak at 1600 to 1800 $cm^{-1}$ was about 3.4% when the height intensity of the ring stretch peak shown at 1500 to 1600 $cm^{-1}$ was assumed as 100%.

Example 1

Compounding of PPS/Elastomer (E-nBA-GMA)

The specimen was prepared by mixing and extruding the PPS with a small twin-screw extruder under the condition of the extrusion die temperature of 300° C. and spindle rotating speed of 200 rpm, while adding the elastomer, E-nBA-GMA (ethylene/n-buthyl acrylate-glycidyl methacrylate) Lotader (Grade AX-8900, made by Arkema) according to the content disclosed in the following Table 1.

Examples 2 and 3

Examples 2 and 3 were progressed substantially according to the same method as in Example 1, except that the content of the PPS resin and the elastomer were changed as disclosed in the following table 1.

Examples 4 and 5

Examples 4 and 5 were progressed substantially according to the same method as in Example 1, except that the content of the PPS resin and the elastomer were changed and glass fiber was added thereto as disclosed in the following table 1.

Comparative Example 1

Preparation of PPS (Polyphenylene Sulfide not Including a Carboxyl Group at the End of the Main Chain)

After melting and mixing the reactant including 5,130 g of p-diiodobenzene (pDIB), 450 g of sulfur, and 4 g of mercaptobenzothiazole as a reaction initiator, completely in a 5 L reactor equipped with a thermocouple capable of measuring the inside temperature of the reactor and a vacuum line for nitrogen purging and vacuumizing by heating the same to 180° C., the polymerization reaction was proceeded by carrying out temperature-rising and pressure reducing step by step from the initial reaction condition of 220° C. to 350 torr to the final reaction temperature of 300° C. and the pressure of 1 torr or less. When the polymerization reaction was proceeded 80% (the proceeding degree of the polymerization reaction was identified by the relative viscosity ratio [(present viscosity/target viscosity)*100%]), 25 g of mercaptobenzothiazole was added thereto as a polymerization inhibitor and the reaction was carried out for 1 hr and then terminated. The final resin obtained by the reaction was prepared into pellets by using a small strand cutter.

Comparative Example 1 was progressed substantially according to the same method as in Example 1, except that the PPS prepared by above method instead of the PPS of Example 1 and the content of the PPS resin and the elastomer were changed as disclosed in the following table 1.

Comparative Example 2

Comparative Example 2 was progressed substantially according to the same method as in Comparative Example 1, except that glass fiber was added to the specimen of Comparative Example 1 and the content of the PPS resin and the elastomer were changed and as disclosed in the following table 1.

Tensile Strength and Elongation

The tensile strength and the elongation of the resin specimens prepared in Examples and Comparative Examples were measured according to ASTM D 638 method.

Flexural Strength and Flexural Modulus

The flexural strength and the flexural modulus of the resin specimens prepared in Examples and Comparative Examples were measured according to ASTM D 790 method.

Izod Impact Strength

The impact strength of the resin specimens prepared in Examples and Comparative Examples was measured according to ASTM D 256 method.

solvent at 50° C. for 1 hr in order to dissolve the elastomer (E-nBA-GMA) and then taken a SEM photo. The SEM photos of the specimen before etching and after etching are respectively shown in FIG. 1 and FIG. 2.

FIG. 1 (before etching): polyphenylene sulfide+elastomer

Figure 2:
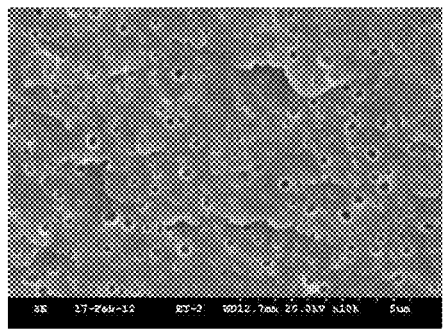
FIG. 2 is a SEM photo of the specimen made of the resin composition of Example 1 after etching.

FIG. 2 (after etching): polyphenylene sulfide

In the present invention, the improved compatibility of the polyphenylene sulfide resin of which at least part of the end group is substituted by a carboxyl group can be observed by the electron microscopy. The size of the elastomer resin dispersed the polyphenylene sulfide resin is preferably 0.8 μm or less, and more preferably 0.5 μm or less. As the pre-treatment of the electron microscopy, the extruded specimen of the polyphenylene sulfide resin composition was frozen and crushed and the elastomer was eliminated from the specimen by dipping the crushed specimen in an organic solvent which can selectively dissolve the elastomer only. The maximum diameter and the minimum diameter of the dispersed elastomer are measured by the electron microscopy, and the average diameter is calculated.

FIG. 1 is a SEM photo of the polyphenylene sulfide resin consisting of the polyphenylene sulfide and the elastomer before etching, and FIG. 2 is a SEP photo thereof after etching. From FIG. 2, it is recognizable that the elastomer is uniformly dispersed and thus the resin according to one embodiment of the present invention has excellent compatibility with the elastomer.

Figure 3:
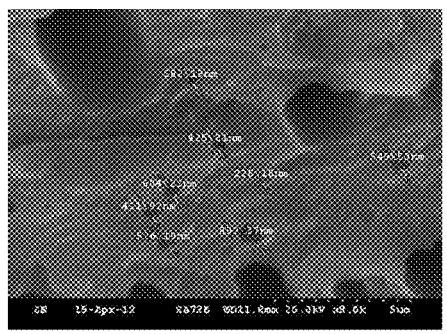
FIG. 3 is a SEM photo of the specimen made of the resin composition of Comparative Example 1 after etching.

FIG. 3 is a SEM photo of the resin according to Comparative Example 1 after etching according to the same method as in Example 1. Comparing to FIG. 2, it is

TABLE 1

|  | Unit | Example | | | | | Comparative Example | |
|---|---|---|---|---|---|---|---|---|
|  |  | 1 | 2 | 3 | 4 | 5 | 1 | 2 |
| PPS | wt % | 95 | 93 | 90 | 62 | 61 | 90 | 62 |
| E-nBA-GMA | wt % | 5 | 7 | 10 | 8 | 9 | 10 | 8 |
| Glass Fiber | wt % | 0 | 0 | 0 | 30 | 30 | 0 | 30 |
| Antioxidant | wt % | 0.2 | 0.2 | 0.2 | 0.2 | 0.2 | 0.2 | 0.2 |
| Tensile Strength | MPa | 64 | 62 | 60 | 152 | 148.2 | 40 | 83 |
| Elongation | % | 2.5 | 3.53 | 25.2 | 4.1 | 4.2 | 11 | 2.3 |
| Flexural Strength | MPa | 114 | 114 | 103 | 222 | 219 | 69 | 120 |
| Flexural Modulus | MPa | 3200 | 3200 | 2872 | 9406 | 9440 | 1725 | 7828 |
| Impact Strength | KJ/m$^2$ | 3.8 | 4.8 | 8.7 | 12.7 | 13.4 | 6.1 | 9.2 |

As shown in Table 1, it is recognizable from Examples 1 to 5 of the present invention that the specimens show excellent tensile strength, elongation, flexural strength, flexural modulus, and impact strength even when the resins are compounded with the epoxy-containing olefin-based elastomer, or with the epoxy-containing olefin-based elastomer and the filler. Furthermore, as the result of comparing Examples 1 to 5 of the present invention with Comparative Examples, it is recognizable that the impact resistance and the strength of the polyarylene sulfide compositions are excellent because carboxyl group (COOH) is introduced at least part of the end of the main chain and the compatibility with the olefin-based elastomer and/or glass fiber is excellent too because of the carboxyl groups.

Etching Treatment

The resin specimen prepared in Example 1 was liquid nitrogen-crushed and sonicated in chloroform (CHCl$_3$) as a recognizable that the elastomer does not uniformly dispersed and the compatibility is inferior to Examples of the present invention.

What is claimed is:

1. A polyarylene sulfide resin composition, including:
   60 to 95 wt % of a polyarylene sulfide resin (A) having a polyarylene sulfide main chain, wherein at least part of an aryl end group of the polyarylene sulfide main chain is substituted by iodine, and wherein at least part of an aryl end group of the polyarylene sulfide main chain is substituted by a carboxyl group; and
   5 to 40 wt % of an epoxy-containing olefin-based elastomer (B).

2. The polyarylene sulfide resin composition according to claim 1, wherein the content of the polyarylene sulfide resin (A) is 70 to 85 wt %, and the content of the epoxy-containing olefin-based elastomer (B) is 15 to 30 wt %.

3. The polyarylene sulfide resin composition according to claim 1, wherein the aryl end group of the polyarylene sulfide main chain substituted by a carboxyl group comprises an arylene group directly bonded to a sulfur atom and a carboxyl group.

4. The polyarylene sulfide resin composition according to claim 3, wherein the arylene group is at least one selected from the group consisting of p-phenylene group, m-phenylene group, o-phenylene group, and a substituted phenylene group.

5. The polyarylene sulfide resin composition according to claim 1, wherein the epoxy-containing olefin-based elastomer (B) includes an epoxy-containing monomer selected from the group consisting of glycidyl acrylate and glycidyl methacrylate.

6. The polyarylene sulfide resin composition according to claim 5, wherein the content of the epoxy-containing monomer is 0.001 to 40 mol % per the whole epoxy-containing olefin-based elastomer.

7. The polyarylene sulfide resin composition according to claim 1, further including an antioxidant.

8. The polyarylene sulfide resin composition according to claim 7, wherein the content of the antioxidant is 0.01 to 5 wt %.

9. The polyarylene sulfide resin composition according to claim 1, wherein the impact strength measured according to ASTM D 256 is 3.0 to 20.0 KJ/m$^2$.

10. A shaped article, including the polyarylene sulfide resin composition according to claim 1.

11. The shaped article according to claim 10, wherein the shape is a film, a sheet, or a fiber.

12. A polyarylene sulfide resin composition, including:
100 parts by weight of:
a resin mixture consisting of 60 to 95 wt % of a polyarylene sulfide resin (A) having a polyarylene sulfide main chain, herein at least part of an aryl end group of the polyarylene sulfide main chain is substituted by iodine, and wherein at least part of an aryl end group of the polyarylene sulfide main chain is substituted by a carboxyl group, and 5 to 40 wt % of an epoxy-containing olefin-based elastomer (B), or
a resin mixture consisting of 70 to 85 wt % of a polyarylene sulfide resin (A) having a polyarylene sulfide main chain, wherein at least part of an aryl end group of the polyarylene sulfide main chain is substituted by iodine, and wherein at least part of an aryl end group of the polyarylene sulfide main chain is substituted by a carboxyl group, and 15 to 30 wt % of an epoxy-containing olefin-based elastomer (B); and
1 to 50 parts by weight of an organic or inorganic filler (C).

13. The polyarylene sulfide resin composition according to claim 12, wherein the organic or inorganic filler is one or more selected from the group consisting of glass fiber, carbon fiber, boron fiber, glass bead, glass flake, talc, and calcium carbonate.

14. A method of preparing a polyarylene sulfide resin composition, including the steps of:
polymerizing a reactant including a diiodioaromatic compound and elemental sulfur;
adding a compound having a carboxyl group while carrying out the polymerization step so as to prepare a polyarylene sulfide resin (A) of which at least part of the end group of the polyarylene sulfide main chain is substituted by a carboxyl group; and
compounding the polyarylene sulfide resin (A) and an epoxy-containing olefin-based elastomer (B), or compounding the polyarylene sulfide resin (A), the epoxy-containing olefin-based elastomer (B), and an organic or inorganic filler (C).

15. The method according to claim 14, wherein the compound having a carboxyl group is one or more compounds selected from the group consisting of 2-iodobenzoic acid, 3-iodobenzoic acid, 4-iodobenzoic acid, and 2,2'-dithiobenzoic acid.

16. The method according to claim 14, wherein the compound having a carboxyl group is added in the amount of about 0.0001 to 5 parts by weight per 100 parts by weight of the diiodoaromatic compound.

17. The method according to claim 14, wherein the diiodoaromatic compound is one or more compounds selected from the group consisting of diiodobenzene, diiodonaphthalene, diiodobiphenyl, diiodo bisphenol, diiodobenzophenone, p-diiodobenzene (pDIB), 2,6-diiodonaphthalene, and p,p'-diiodobiphenyl.

18. The method according to claim 14, wherein the compounding step is carried out with a twin-screw extruder.

19. The method according to claim 14, wherein the end group of the polyarylene sulfide main chain substituted by a carboxyl group comprises an arylene group directly bonded to a sulfur atom and a carboxyl group.

20. The method according to claim 14, wherein the epoxy-containing olefin-based elastomer (B) includes an epoxy-containing monomer selected from the group consisting of glycidyl acrylate and glycidyl methacrylate.

21. The method according to claim 14, wherein the organic or inorganic filler is one or more selected from the group consisting of glass fiber, carbon fiber, boron fiber, glass bead, glass flake, talc, and calcium carbonate.

\* \* \* \* \*